United States Patent

[11] 3,629,685

| [72] | Inventor | Arne Johansson |
| | | Grangesberg, Sweden |
| [21] | Appl. No. | 91,328 |
| [22] | Filed | Nov. 20, 1970 |
| [45] | Patented | Dec. 21, 1971 |
| [73] | Assignee | Allmanna Svenska Elektriska Aktiebolaget |
| | | Vasteras, Sweden |

[54] STATIC CONVERTER STATION CONNECTED TO A DC TRANSMISSION LINE OVER A DC REACTOR WITH LIGHTNING ARRESTER PROTECTION MEANS
4 Claims, 4 Drawing Figs.

[52] U.S. Cl.................................................... 321/13, 317/61.5, 321/14
[51] Int. Cl........................................................H02m 1/18, H02p
[50] Field of Search........................................ 321/12-14; 317/61, 61.5; 315/36, 128, 290; 307/86

[56] References Cited
UNITED STATES PATENTS

| 2,684,460 | 7/1954 | Busemann.................. | 321/13 X |
| 3,036,257 | 5/1962 | Uhlmann..................... | 321/14 X |
| 3,559,036 | 1/1971 | Kanngiesser................ | 321/13 |
| 3,418,530 | 12/1968 | Cheever...................... | 315/36 X |

FOREIGN PATENTS

| 123,599 | 1959 | U.S.S.R........................ | 321/14 |

*Primary Examiner*—William H. Beha, Jr.
*Attorney*—Jennings Bailey, Jr.

ABSTRACT: A static converter station connected to a DC transmission line over a DC reactor is provided with lightning arrester protection means which includes a spark gap stack connected to the DC line and provided with a starting mechanism for its ignition, and with an arrangement responsive to earth faults in the station to control the starting mechanism to trigger the lightning arrester.

INVENTOR.
ARNE JOHANSSEN
BY
Jennings Bailey, Jr

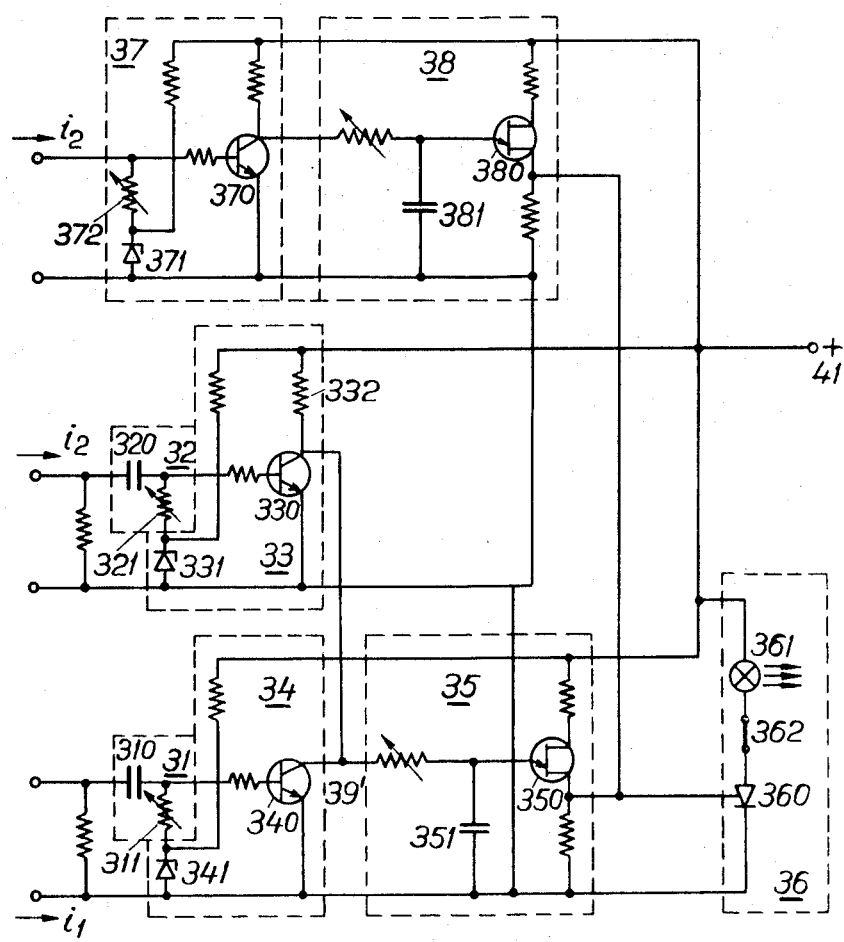

STATIC CONVERTER STATION CONNECTED TO A DC TRANSMISSION LINE OVER A DC REACTOR WITH LIGHTNING ARRESTER PROTECTION MEANS

BACKGROUND OF THE INVENTION

1. Field of the Invention

The present invention relates to a lightning arrester or surge diverter protection means for a static converter station connected to a DC transmission line over a DC reactor.

2. The Prior Art

In power transmission lines for high-voltage direct current in which the DC line is connected at the ends to AC networks over static converter stations, the demands made on protection apparatus and insulation in these stations are considerable. This is particularly so if the stations comprise several series-connected static converters where the voltage from earth to the converter having the highest potential is several times greater than the voltage over the static converter. In this case, therefore, the insulation level to earth must be increased from converter to converter, seen from earth towards the transmission line, although the converters otherwise have the same rated voltage.

The reason for the demand for protection means and insulation for partial converters is, inter alia, that an earth fault somewhere in the station may cause the entire line voltage to fall on one or more components which are not dimensioned for this and would therefore break down if they were not protected by special overvoltage protection means. In converters having thyristor-rectifiers for example, the separate rectifiers are normally protected against overvoltages with the help of lightning arrestor protection means parallel-connected with the rectifiers. These protection means are in the first place intended to protect the rectifiers against overvoltages coming from connected lines and overvoltages which can be generated within the converters if a converter fault arises. An earth fault within the converter station gives, however, considerably higher strain since the entire energy stored in the DC line can flow through lightning arresters over separate rectifier paths, thus causing a much greater strain on these lightning arresters. Although it is not impossible to dimension the arresters for this great energy, it is obvious that this will be very expensive.

SUMMARY OF THE INVENTION

In order to avoid these problems it is proposed according to the invention to arrange a surge diverter outside the DC reactor of the station and provide this surge diverter with a special starting or ignition means which is controlled by a fault indicator in the station. In this way, a fault in the station will with very little delay cause the DC line to be connected to earth over the surge diverter so that the energy in the line will never pass the station. The surge diverter suitably consists of a spark gap stack, while the starting mechanism consists of a thyristor stack in series with the spark gap stack. By igniting the thyristor stack a greater portion of the line voltage will fall over the next adjacent spark gap which then starts a successive arc-through of the whole arrester stack.

The arrester must be able to ignite at a line voltage which does not to any great extent exceed the operating voltage from a single part-converter. On the other hand, the surge diverter must not react for overvoltages which may occur on the transmission line. Suitably a normal overvoltage arrester is connected to the line parallel to the surge diverter according to the invention, and this overvoltage arrester should have an ignition voltage lying a good way below the voltage strength of the arrester according to the invention when this is blocked.

Brief Description of the Drawings

The invention otherwise will be described with reference to the accompanying drawings in which FIG. 1 shows how a surge diverter according to the invention is connected in a static converter station, whereas

FIG. 3 and 4 shows examples of how the fault indicator can be designed.

DESCRIPTION OF THE PREFERRED EMBODIMENTS

Figure 1:
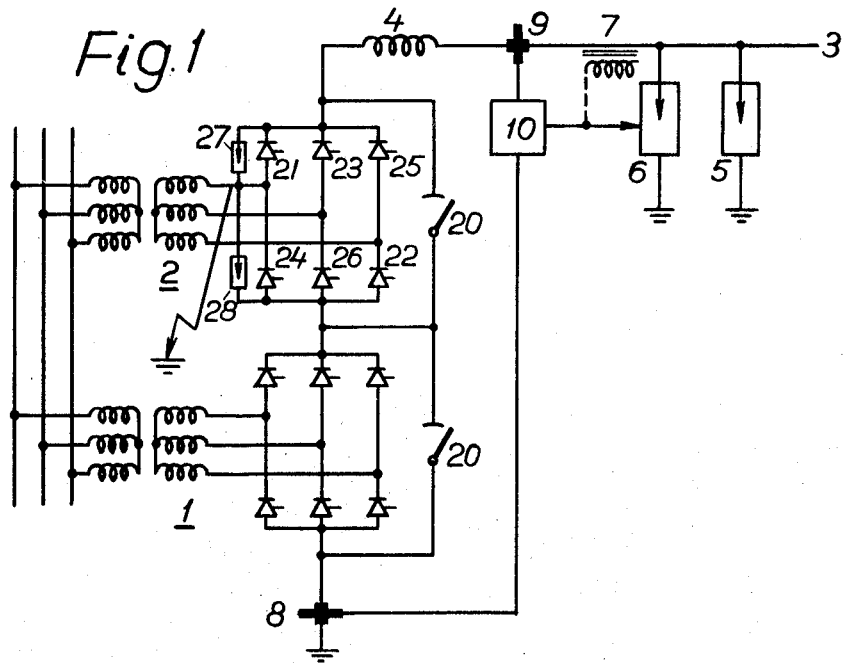

FIG. 1 shows a converter station comprising two series-connected static converters 1 and 2, each comprising a rectifier bridge and a converter transformer. The converters are connected over a smoothing reactor 4 to a DC line 3. Outside the reactor 4, between the DC line 3 and earth, a normal overvoltage lightning arrester 5 is connected for protection against overvoltages on the line, and also a controlled surge diverter protection means 6 according to the invention.

The importance of the latter protection will be seen on observing the converter 2. The rectifiers 21–26 are parallel-connected with individual arrester protection means, only the protection means 27, 28 for the rectifiers 21 and 24 being shown. These arresters are intended to protect the rectifiers against overvoltages. Semiconductor rectifiers especially are very sensitive to such overvoltages and these individual arresters must therefore be of a special construction in order to give the necessary safety. As well as these arresters for the separate rectifiers there may be several other arresters over different components. Most of these arresters are dimensioned for the specific purpose for which they are intended and are therefore unable to take up greater energies than those they are intended for.

If an earth fault is now imagined in one of the phase conductors between the converter-transformer and the rectifier bridge, as indicated in the drawing, it can be seen that the entire line voltage will fall over the rectifier 21 and its arrester 27, which will therefore ignite. Although earth faults within the station are not very usual, they can never be disregarded, unless quite unreasonable safety precautions are taken, and in the case in question the earth fault means that the capacitive energy stored in the transmission line 3 will be discharged through the arrester 27. To make this arrester sufficiently sensitive to protect the rectifier 21 against more normal overvoltages and at the same time sufficiently robust to withstand the entire energy in the transmission line would be a considerable complication. Instead, according to the invention the controlled surge diverter protection means 6 has been inserted which ignites if there is a fault in the station and thus diverts most of the line energy, while the arrester 27 need only divert a limited energy and current determined by the time necessary to get the fault indicator functioning and start the protection means 6.

Such a fault indicator may consist of a differential protection means comprising current-sensitive elements, for example hall generators or transductors 8 and 9 on both sides of the station. These current sensitive elements are connected to an electronic balance relay 10 which controls the arrester 6. A difference in the current on both sides of the station probably means an earth fault has arisen in the station and is therefore an indicator that the arrester 6 should be triggered. Such a current difference will cause the balance relay 10 to emit an output signal to the arrester 6. The relay 10 should be given a certain sensitivity in order to avoid unnecessary triggering caused by current oscillation or unimportant current differences/ The relay is also suitably made sensitive to the time derivative in order to achieve rapid triggering.

Figure 3:
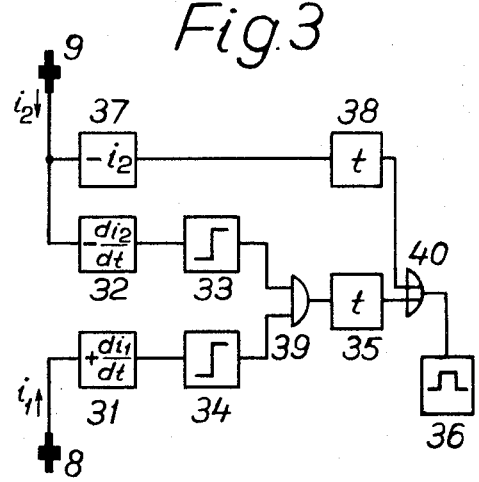

The relay 10 is shown as a block diagram in FIG. 3 and in more detail in FIG. 4. In FIG. 3 the transductors 8 and 9 are connected to deriving members 31 and 32, respectively, with level indicators 34, 33, respectively, arranged on their output sides. These are in turn connected to an AND-gate 39, from which the signal is carried over the delay means 35 and an OR-gate 40 to a pulse emitter 36. For those cases in which the impedance in the earth fault is so great that the earth-fault current grows so slowly that the level indicators 33 and 34 do not react, there is a parallel circuit 37, 38 where 37 is a current sensitive member which senses if the line current alters direction and reaches a certain value in the opposite direction.

The member 37 is connected over the delay circuit 38 to the OR-gate 40.

FIG. 4 shows a more detailed diagram of the balance relay shown in FIG. 3. As in FIG. 3, the current signals from the transductors 8 and 9 corresponding to the main currents of the converter, are designated $i_1$, $i_2$, respectively, and the reference numbers are the same in both figures.

FIG. 4 comprises three parallel input circuits fed from a positive voltage source over the terminal 41. If the lower of these is considered, this is affected on the input side to the left by the current signal $i_1$ from the transductor 8 with the shown polarity. The deriving circuit 31 consists of a capacitor 310 in series with a variable resistor 311 and a zener diode 341 in the level indicator 34. Otherwise, this consists principally of a transistor 340. The member 32 and 33 in the parallel circuit have the same construction except that the input signal $i_2$ from the transductor 9 is connected with opposite polarity. The transductors 330 and 340 are connected by their collectors over the resistor 332 to the terminal 41. The same is the case with the upper terminal on the zener diodes 331 and 341.

As long as the station is faultless, $i_1$ is equal to $i_2$ and the current is normally constant, which means that the current through the capacitors 310 and 320 is zero. This means that the base of the transistors 330 and 340 is only affected by the zener voltage over 331 and 341, respectively, which is sufficient to keep the transistors conducting. This meaN that the point 39' which corresponds to the AND-gate 39 in FIG. 3 has zero potential and nothing happens in the member 35.

Figure 2:
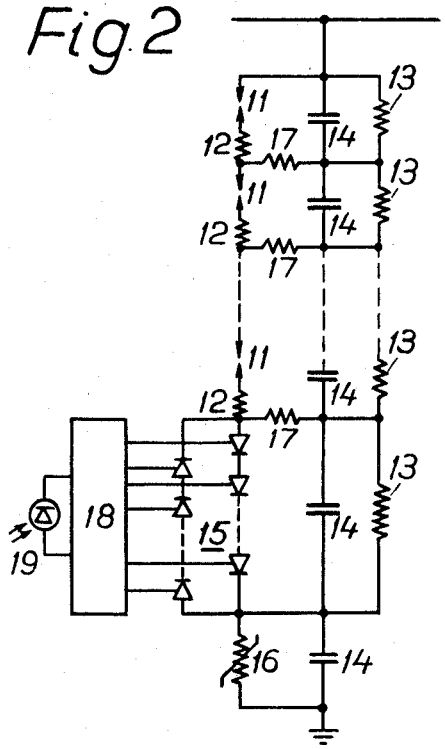
FIG. 2 shows how the surge diverter protection means is constructed.

If the current $i_1$ increases, this means that a charging current will arise in the capacitor 310 and the resultant voltage over the resistor 311 will block the transistor 340. If the current increases is caused by a current increase in the whole station and the line 3 in FIG. 1, $i_2$ will also increase. However, this will give no alteration in the circuit 32, 33. The point 39' will therefore still have zero potential. If, on the other hand, the increase of $i_1$ is caused by an earth fault in the station, $i_2$ will decrease, thus causing a discharge current in the capacitor 320 and a voltage over the resistor 321 so that the transistor 330 is also blocked. Point 39' will thus acquire positive potential, whereupon the capacitor 351 in the member 35 starts to charge. When the voltage over the capacitor has become sufficiently high, the unijunction transistor 350 becomes conducting and the pulse on its cathode will ignite the thyristor 360 in the tripping means 36. The lamp 361 is thus ignited, which is arranged to actuate a photocell 19 to trigger the lightning arrester protection means 6, as is seen in FIG. 2.

If the time derivatives of $i_1$ and $i_2$ are too small to block the transistors 330 and 340, but the earth fault current in any case grows too great, the circuit 37, 38 will come into operation. This circuit is constructed in the same way as the parallel circuit 32,33,35 apart from the capacitor 320. As long as $i_2$ goes in the right direction the transistor 370 will be conducting because of the voltage over the zener diode 371 and 38 will therefore receive the input voltage zero. If, on the other hand, $i_2$ turns and increases in the opposite direction, 370 will be blocked, whereupon the capacitor 381 receives voltage and after a time the unijunction transistor 380 will emit a pulse to the thyristor 360.

In order to be able to zero-set the number 36 after a release, the series-contact 362 has been inserted. This breaks the current through the thyristor 360 by opening.

As mentioned, there must be a rapid indication of an earth fault so that there is time to trigger the lightning arrester protection means 6 before anything is destroyed in the station. On the other hand, it is unnecessary to be so hasty that the risk of triggering due to harmless disturbances is too great. For this reason the delay means 35 and 38 have been introduced in order to give just so much delay that a release is certain to be produced if the fault is permanent. If, on the other hand, the fault is not permanent, the signals blocking the transistors 330, 340 or 370 will disappear and the capacitors 351 and 381, respectively, will stop being charged before the corresponding unijunction transistor 350, 380, respectively, has time to become conducting.

Instead of the differential protection means described above it is also possible to use a so-called reverse current indicator 7 in accordance with British PAT. No. 955,847 an earth fault indicator. Such an indicator may be connected in the vicinity of the reactor 4 and its use is based on the fact that the discharge current from the line is oppositely directed to the working current. An earth fault within the station will there cause a current reversal in the reactor 4 and this current reversal may be used as indication of a fault. The reverse current indicator will therefore have approximately the same function as the members 37 and 38 in FIG. 3.

FIG. 2 shows the design of the lightning arrester 6 according to the invention. This comprises a number of series-connected spark gaps 11 having series resistors 12. The spark gaps are parallel-connected to resistors 13 and capacitors 14 to ensure the voltage distribution between them. In the cross-connections between the voltage divider and the spark gap stack resistors 17 are inserted to limit the discharge current from the capacitors 14 when the gaps ignite. In the lower part of the arrester a number of spark gaps have been replaced by a number of series-connected thyristors 15 arranged in two parallel branches oppositely directed. An extra voltage dependent series resistor 16 having relatively low resistance may also be connected as shown.

If an earth fault occurs within the station this will cause, as mentioned, a signal from the electronic balance relay 10 or the reverse current indicator 7, in both cases in the form of a light pulse affecting a photocell 19 in FIG. 2 which forms the input circuit for a control pulse generator 18 for the thyristors 15. The thyristors 15 will thus ignite and the voltage over the lower part of the arrester 6 will collapse. A surge voltage will thus lie over the lowermost spark gap(s) 11 which are thus ignited, after which the voltage of the gaps above is increased. A cascadelike process is thus produced so that the entire lightning arrester protection means 6 becomes conducting and the energy in the DC line is discharged through this arrester. When this has occurred so that the line becomes voltageless or its voltage has dropped to a certain low value, the spark gaps of the arrester will be extinguished and, assuming that there has been time to correct the fault in the station, the equipment can be restarted when the contact 362 in FIG. 4 has been briefly opened.

From the above it is clear that the thyristor part of the arrester 6 must form such a large part of the arrester that the voltage over the arrester is enough to ignite the adjacent gap when the thyristors have been ignited. Closer examination shows that it is generally sufficient if the voltage over the thyristor part corresponds to the voltage over a few spark gaps.

FIG. 2 shows thyristors 15 in two parallel branches having opposite conducting directions. This is because this type of discharge often causes oscillations and the arrester 6 must therefore be able to conduct in both directions.

In FIG. 1 the arrester protection means 6 has been placed on the line side of the reactor 4. This has the disadvantage that the energy in the reactor due to the current direction must be discharged through the arrester 27 or a corresponding arrester within the station in spite of the activation of the arrester protection means 6. This could be avoided by placing 6 on the rectifier side of 4. However, this positioning means that if the arrester 6 is triggered unnecessarily, the entire station will be short circuited, thus causing considerable strain on the rectifiers. With this positioning the arrester protection means can have a fairly high impedance and thus ensure proper current commutation from arresters 27 and 28, which is an advantage. Location on the line side will require lower impedance of the member 6 as well as shorter fault detection times for a given amount of energy to be discharged through the arresters 27 and 28. The actual choice of location is a question of transmission line configuration and balances between such aspects as an arrester duty and system operation.

As mentioned, the arrester protection means 6 is parallel connected with a normal over voltage arrester 5 and the series-connected spark gaps 11 and thyristors 15 and the voltage-divider resistors 13 and capacitors 14 connected in parallel therewith are so dimensioned and adjusted in relation to each other that the voltage strength of the surge diverter protection means exceeds by a good margin the ignition voltage of the overvoltages arrester 5. In this way it is ensured that overvoltages in the line are discharged through the arrester 5.

I claim:

1. In combination with a static converter station connected to a DC transmission line over a DC reactor, lightning arrester protection means comprising a spark gap stack (6) connected to the DC line and provided with a starting mechanism (15, 18, 19) for its ignition, and means (10, 7) responsive to earth faults in the station to control said starting mechanism.

2. In a combination according to claim 1, said starting mechanism comprising a thyristor stack (15) in series with the spark gap stack (11).

3. In a combination according to claim 1, said fault-responsive means comprising current-sensitive member (8,9) connected in the station.

4. In a combination according to claim 1, for a static converter station provided with an overvoltage arrester (5) connected in parallel to the lightning arrester protection means (6), the voltage stability of the lightning arrester protection means in blocked state exceeding the ignition voltage of said over-voltage arrester.

* * * * *